(12) United States Patent
Kein

(10) Patent No.: US 7,877,191 B2
(45) Date of Patent: Jan. 25, 2011

(54) METHOD OF ADAPTING AN INTERNAL COMBUSTION ENGINE TO THE QUALITY OF THE FUEL USED

(75) Inventor: Thibault Kein, Toulouse (FR)

(73) Assignee: Continental Automotive France, Toulouse (FR)

(*) Notice: Subject to any disclaimer, the term of this patent is extended or adjusted under 35 U.S.C. 154(b) by 202 days.

(21) Appl. No.: 12/159,989

(22) PCT Filed: Jan. 8, 2007

(86) PCT No.: PCT/EP2007/000081

§ 371 (c)(1),
(2), (4) Date: Jul. 3, 2008

(87) PCT Pub. No.: WO2007/080076

PCT Pub. Date: Jul. 19, 2007

(65) Prior Publication Data

US 2008/0281501 A1 Nov. 13, 2008

(30) Foreign Application Priority Data

Jan. 11, 2006 (FR) .................................. 06 00222

(51) Int. Cl.
*F02D 41/06* (2006.01)
*F02D 41/14* (2006.01)
*G06F 19/00* (2006.01)

(52) U.S. Cl. .................. 701/111; 701/113; 123/179.16

(58) Field of Classification Search .................. 701/103, 701/104, 109–111, 113, 115; 123/179.16, 123/179.17, 436, 491

See application file for complete search history.

(56) References Cited

U.S. PATENT DOCUMENTS

| 4,502,444 A | * | 3/1985 | Rubbo et al. ................. 123/695 |
| 5,359,519 A | * | 10/1994 | Jehanno ....................... 701/108 |
| 5,419,296 A | | 5/1995 | Yamaura |
| 5,456,594 A | * | 10/1995 | Yap ................................ 431/1 |
| 5,582,157 A | | 12/1996 | Uchikawa |
| 6,176,222 B1 | | 1/2001 | Kirwan et al. |
| 2003/0213475 A1 | | 11/2003 | Robertson et al. |
| 2005/0166890 A1 | * | 8/2005 | Wickman et al. ........... 123/276 |

FOREIGN PATENT DOCUMENTS

EP    1 079 089 A2    2/2001

* cited by examiner

*Primary Examiner*—Willis R. Wolfe, Jr.
*Assistant Examiner*—Johnny H Hoang
(74) *Attorney, Agent, or Firm*—Young & Thompson

(57) ABSTRACT

A process for controlling supplying fuel for an internal combustion engine, employed when the engine is started, including: measuring at least one characteristic value of an engine speed representative of a richness of a fuel/oxidant supply mixture for the engine, comparing the measured characteristic value with a reference value so as to determine a value of the difference between these two values, and controlling the supply unit using a control signal emitted by a control unit (3) and dependent on the difference value. The process also includes an updating step of producing an updated reference value (21), when an aging threshold of the engine is passed.

9 Claims, 2 Drawing Sheets

METHOD OF ADAPTING AN INTERNAL COMBUSTION ENGINE TO THE QUALITY OF THE FUEL USED

The invention relates, generally, to a starting operation for an internal combustion engine according to the quality of the fuel used.

More specifically, the invention relates to a method of controlling fuel supply means of an internal combustion engine, employed when the engine is started, this method comprising steps consisting in measuring at least one characteristic value of an engine speed representative of a richness of a fuel/oxidant supply mixture for the engine, comparing said measured characteristic value with a reference value so as to determine a value of the difference between these two values, and controlling said supply means using a control signal emitted by a control unit and dependent on said difference value.

Such a method is well-known to the person skilled in the art. In fact, there are, on the market, several qualities of fuels which can be used for the same engine, in particular very poor-quality, that is to say slightly volatile, fuels, and very rich, that is to say very volatile, fuels. It is therefore necessary to make corrections to the richness of the fuel for an engine to start well.

Since the richness corrections which the engine control systems may have to make can be up to several tens of percent, however, the polluting emissions soon become substantial.

In general, a standard start is anticipated for a "standard" fuel and the starting operation consists in adjusting the richness of the mixture during the start if the latter is not satisfactory. This method is known by the acronym FQA (Fuel Quality Adaptation), that is to say "adapting to the quality of the fuel". The engine speed, for example, is monitored and, if the gradient of the increase in engine speed is not as required, the richness of the fuel/oxidant mixture is varied in real time. Alternatively, the number of passages of the pistons through Top Dead Center (TDC) before the increase in engine speed can be monitored (the leaner the fuel/oxidant mixture, the more piston passages through TDC will be necessary before the engine starts). A deviation value of the engine speed after its return to the idling speed when an engine starts can also be noted and, after comparison with a reference value, the quality, or richness, of the fuel/oxidant mixture used can be determined.

These means of detection of the quality of the fuel/oxidant mixture carry out a measurement of a characteristic value of the engine speed followed by a comparison of this measured characteristic value with a reference value.

Nevertheless, the reliability of these means of detection is dependent on the relevance of the reference values used to define a deviation from the characteristic values of true engine speed. It is important to note that the aging of an engine adversely affects its operation, and that these reference values can vary in particular according to the age of the engine, the number of operating hours, the mileage, or any other parameter linked to a deterioration of the operation of the engine. There is therefore a problem of reliability when comparing the measured characteristic value with these reference values.

Thus, an object of the present invention is to provide a method of detection of the quality of the fuel/oxidant mixture which is generally free of the limitations mentioned above.

To this end, the inventive method of controlling means of adjusting the fuel supply of an internal combustion engine, which is moreover in accordance with the general definition which the preamble above gives of it, is generally characterized in that it also comprises an updating step consisting in producing an updated reference value when an aging threshold of the engine is passed.

Owing to this arrangement, this method makes it possible to obtain a measurement of the richness of the fuel/oxidant mixture which is more accurate than that of systems currently used, in particular in the long term.

According to one aspect of the invention, the updated reference value is produced using a computer map dependent on the mileage, the number of operating hours and/or the age of the vehicle.

In a preferred embodiment of the invention, the updating step precedes the comparison step.

According to another aspect of the invention, the measured characteristic value is the number of passages through top dead center of the pistons of the engine, required to start the engine.

As an alternative, the measured characteristic value is the gradient of increase in speed of the engine.

As another alternative, the measured characteristic value is the deviation value when the engine returns to the idling speed.

Moreover, according to another of its aspects, the invention relates to a device for controlling, when an internal combustion engine is started, fuel supply means of this engine, this device comprising a sensor, an electronic control unit, and a means of adjusting the fuel supply, the electronic control unit comprising a means of comparison controlled by a reference value and a control unit, this device being characterized in that it also comprises a unit for producing an updated reference value, which is calculated on the basis of the aging condition of the engine.

According to this aspect of the invention, the unit for producing an updated reference value can be a computer map.

In addition, according to this aspect of the invention, said production of an updated reference value is carried out when an aging threshold is reached.

Other features and advantages of the invention will emerge clearly from the description which is given of it hereinafter, as a nonlimiting example.

Figure 1:
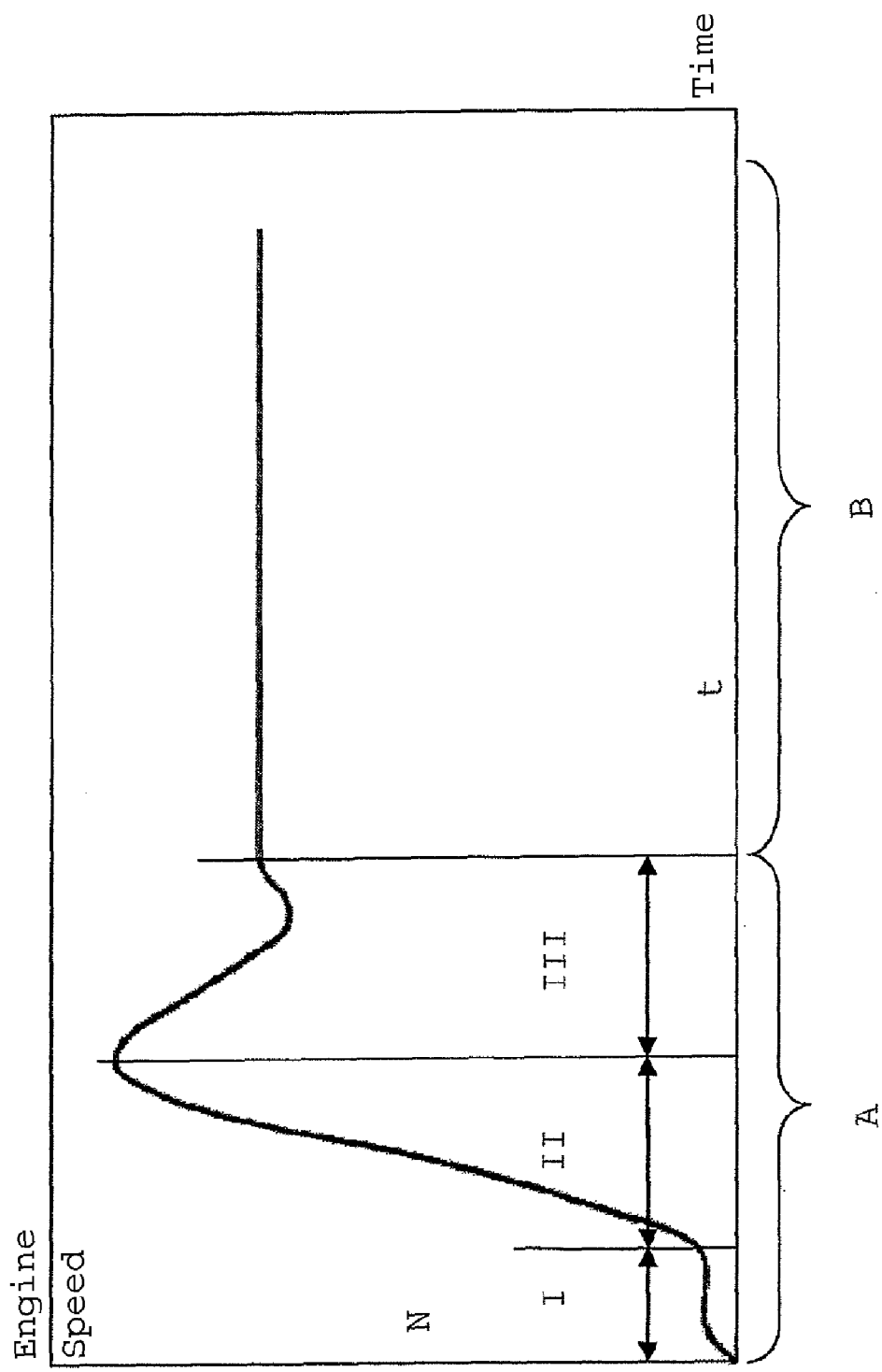
FIG. 1 shows a diagram illustrating a graph of engine speed with time during a start.

In FIG. 1, the presence of a transient engine speed A, and a steady engine speed B, can easily be seen.

The transient engine speed A is composed of several consecutive phases I, II and III.

The first phase I is the starting of the engine with the help of the starter motor, during which the engine is driven mechanically and the synchronization of the engine is identified. By "synchronization" is meant the determination of the exact position of the pistons in their respective cylinders and the stroke of the cycle (induction, compression, combustion, exhaust) in which they are engaged. This phase comprises the starting of actions, such as the injection and the ignition. At this moment, it is possible to measure the number of passages of the pistons through Top Dead Center required to obtain a first explosion. Such a measurement in fact gives information about the quality of the fuel/oxidant mixture used, to the extent that a poor-quality gasoline will require more passages through Top Dead Center to explode.

The second phase II comprises the increase in speed of the engine as soon as the first combustions take place. This increase reaches a maximum which is higher than the idling speed. In most cases, the fuel/oxidant mixture is enriched during this phase so as to obtain a clean, rapid, reproducible start and therefore a "sound" method. The measurement of the gradient of this increase in engine speed is a characteristic value of the engine speed, making it possible to determine the quality, or the richness, of the fuel/oxidant mixture used. In fact, a gentle gradient will usually be representative of a poor-quality gasoline requiring an enrichment.

The last phase III of the transient engine speed is the return to the idling speed. Several situations can occur. In fact, sometimes the return can be made by a gentle reduction of the engine speed, while in other cases the engine speed can drop below the engine idling speed and then rise again. This phase of return to the idling speed is also and above all affected by the nature, therefore the richness, of the fuel/oxidant mixture. During this phase, an operation to measure a maximum deviation value of the engine speed can be carried out. The maximum deviation value is the minimum value that the engine speed reaches when the engine returns to the idling speed, before rising again until it stabilizes at this idling speed. The leaner the mixture, the more the engine speed will drop below the idling speed reference value, and therefore the greater will be the maximum deviation value compared with the measured idling speed of the engine.

After these phases, once the idling speed has settled, the engine is considered to be in steady phase B, that is to say that its idling speed has stabilized.

The operations to measure engine speed carried out in the context of the present invention can therefore be of various types. One can therefore find out the richness of an engine fuel/oxidant supply mixture by observing the number of passages of the pistons through Top Dead Center required to obtain the first explosion. Also, the gradient of the increase in engine speed is characteristic of the richness of an engine fuel/oxidant supply mixture, a poor-quality gasoline resulting in a gentler gradient. Finally, at the moment of the return to the idling speed, the occurrence of a low point below the idling speed is also characteristic of the richness of an engine fuel/oxidant supply mixture.

It is important to note that the parameters mentioned above which can be measured are cited as an example, and that any other means of determining the quality, or richness, of the fuel/oxidant mixture is also considered as being part of the invention.

Figure 2:
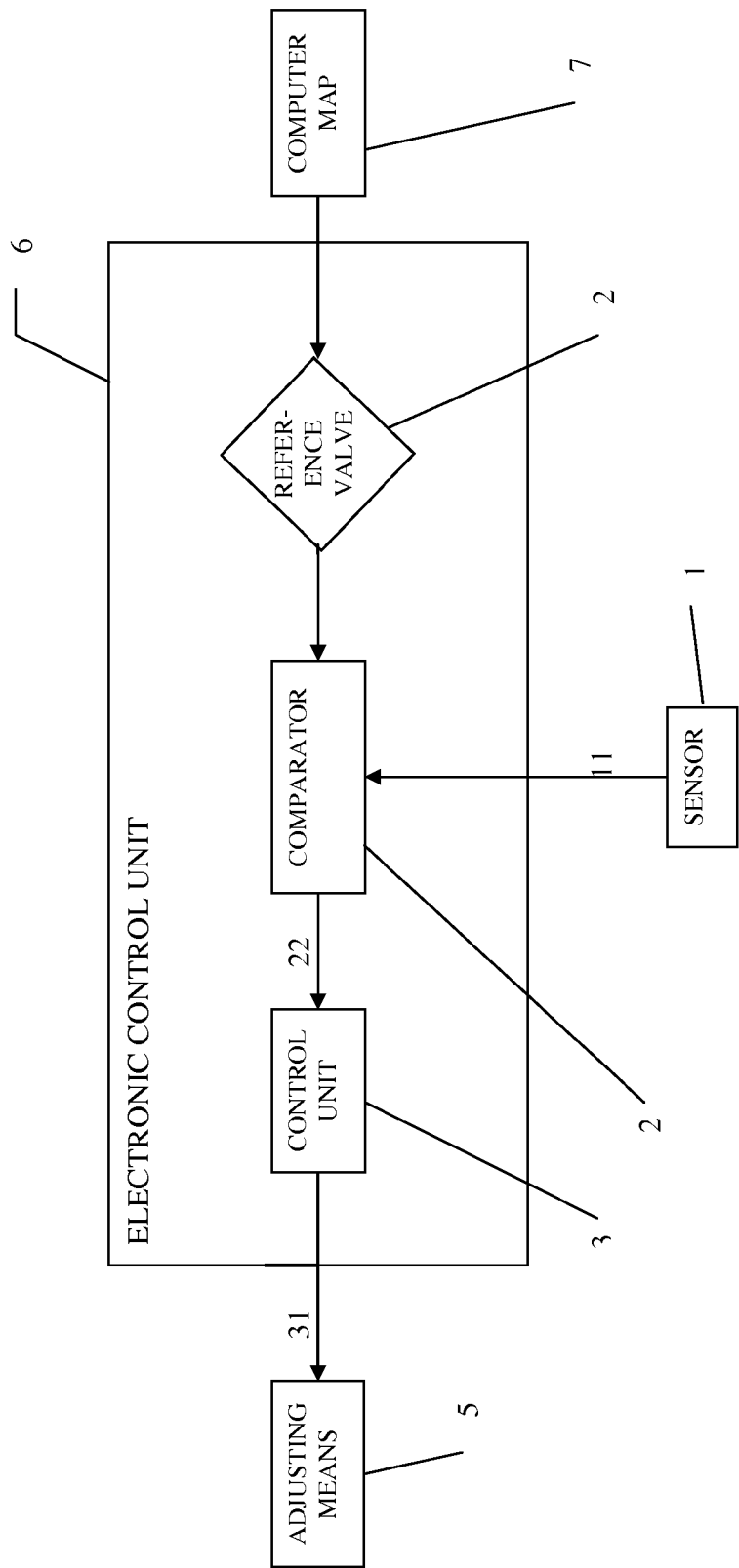
FIG. 2 illustrates schematically an internal combustion engine regulation circuit according to an embodiment of the invention.

Illustrated schematically in FIG. 2 is a fuel supply control circuit according to an embodiment of the present invention, comprising a sensor 1, an electronic control unit 6, a means 5 of adjusting the supply of fuel/oxidant mixture and a computer map 7, said electronic control unit 6 comprising a means of comparison 2 controlled by a reference value 21 and a control unit 3. Preferably, the sensor 1 is a speed sensor installed on a crankshaft, for example. This sensor 1 measures a characteristic value 11 of the engine speed representative of a richness of a fuel/oxidant supply mixture of the engine, and produces a measurement signal representing this characteristic value 11. This signal is sent to the electronic control unit 6 where its characteristic value 11 is compared with a reference value 21 so as to determine a value of the difference 22 between said measured characteristic value 11 and the reference value 21.

According to the invention, the reference value 21 used to determine the difference value 22 is not a fixed value. In fact, the aging of the engine affects its performance, and therefore the engine speed varies with the aging of the engine. Thus, a computer map 7 dependent on the aging condition of the engine was included, which produced the updated reference values 21 when an aging threshold was reached and which transmitted them to the electronic control unit 6. Preferably, the production of such an updated reference value 21 has taken place before the comparison step so that this step can be carried out with this updated reference value 21 although that is not a prerequisite in the case where, for example, several updated reference values 21 are produced in quick succession.

The updated reference values 21 can depend on any engine-aging parameter, for example the mileage, the age, and the number of operating hours. In the same way, the aging threshold ordering the production of an updated reference value 21 is variable, as is the frequency of this production of these updated reference values 21. In fact, the aging threshold can be, for example, defined as being a number of starts or a number of miles, as required.

As mentioned above, the updates involve the reference value 21. This value 21 can involve various parameters.

In fact, to the extent that several parameters can give information about the richness of the fuel/oxidant mixture, these parameters can therefore all be measured and must be compared with a reference value 21 relating of course to the same parameter. The updates must therefore correct the reference value 21 regardless of the parameter represented, for example the number of Top Dead Centers, the gradient of increase in engine speed or even the idling speed deviation value, or any value of the same type. Some examples of updated reference values 21 are for example for an engine having driven 193, 121 kilometers (120,000 miles), a number of passages of the pistons through Top Dead Center increased by 1 or 2, a minimum gradient of increase in engine speed reduced by a few tens of RPM/TDC (revolutions per minute/top dead center), or even an idling speed deviation value with a few tens of RPM added.

Once the measured characteristic value 11 has been received by the electronic control unit 6, this value is compared with the updated reference value 21. From this comparison a difference value 22 is derived which is transmitted to a control unit 3. The control unit 3, having analyzed the difference value 22, generates a control signal 31 addressed to the supply means 5 to adjust the richness of the fuel/oxidant supply mixture for the engine.

The invention claimed is:

1. A method for controlling fuel supply of an internal combustion engine, employed when the engine is started, the method comprising steps comprising:
   fuel supply means for supplying the fuel into the engine;
      measuring at least one characteristic value (11) of an engine speed representative of a richness of a fuel/oxidant supply mixture for the engine;
      comparing said measured characteristic value (11) with a reference value (21) so as to determine a different value (22) between said measured characteristic valve (11) and said reference valve (21); and
      controlling said fuel supply means (5) using a control signal (31) emitted by a control unit (3) and dependent on said different value (22); and
      updating said reference value (21) when an aging threshold of the engine is passed, wherein the updating of the reference value (21) is produced using a computer map (7) dependent on a mileage, a number of operating hours and/or an age of the vehicle.

2. The method for controlling fuel supply according to claim 1, wherein said updating step precedes said comparison step.

3. The method for controlling fuel supply according to claim 1, wherein the measured characteristic value (11) is the number of passages through top dead center of pistons of the engine, required to start the engine.

4. The method for controlling fuel supply according to claim 1, wherein the measured characteristic value (11) is a gradient of increase in speed of the engine.

5. The method for controlling supply according to claim 1, wherein the measured characteristic value (11) is a deviation value when the engine returns to the idling speed.

6. The method for controlling fuel supply according to claim 2, wherein the measured characteristic value (11) is the number of passages through top dead center of pistons of the engine, required to start the engine.

7. The method for controlling fuel supply according to claim 2, wherein the measured characteristic value (11) is a gradient of increase in speed of the engine.

8. The method for controlling fuel supply according to claim 2, wherein the measured characteristic value (11) is a deviation value when the engine returns to the idling speed.

9. A device for controlling, when an internal combustion engine is started, fuel supply means of this engine, said device comprising a sensor (1), an electronic control unit (6), and a means (5) of adjusting the fuel supply, said electronic control unit comprising a means of comparison (2) controlled by a reference value (21) and a control unit (3), as well as a unit for producing an updated reference value (21) which is calculated on the basis of a aging condition of the engine, wherein said unit for producing a reference value (21) is a computer map (7).

* * * * *